T. BODDE.
SURVEYING MACHINE.
APPLICATION FILED FEB. 28, 1913.
1,200,702.
Patented Oct. 10, 1916.
4 SHEETS—SHEET 2.
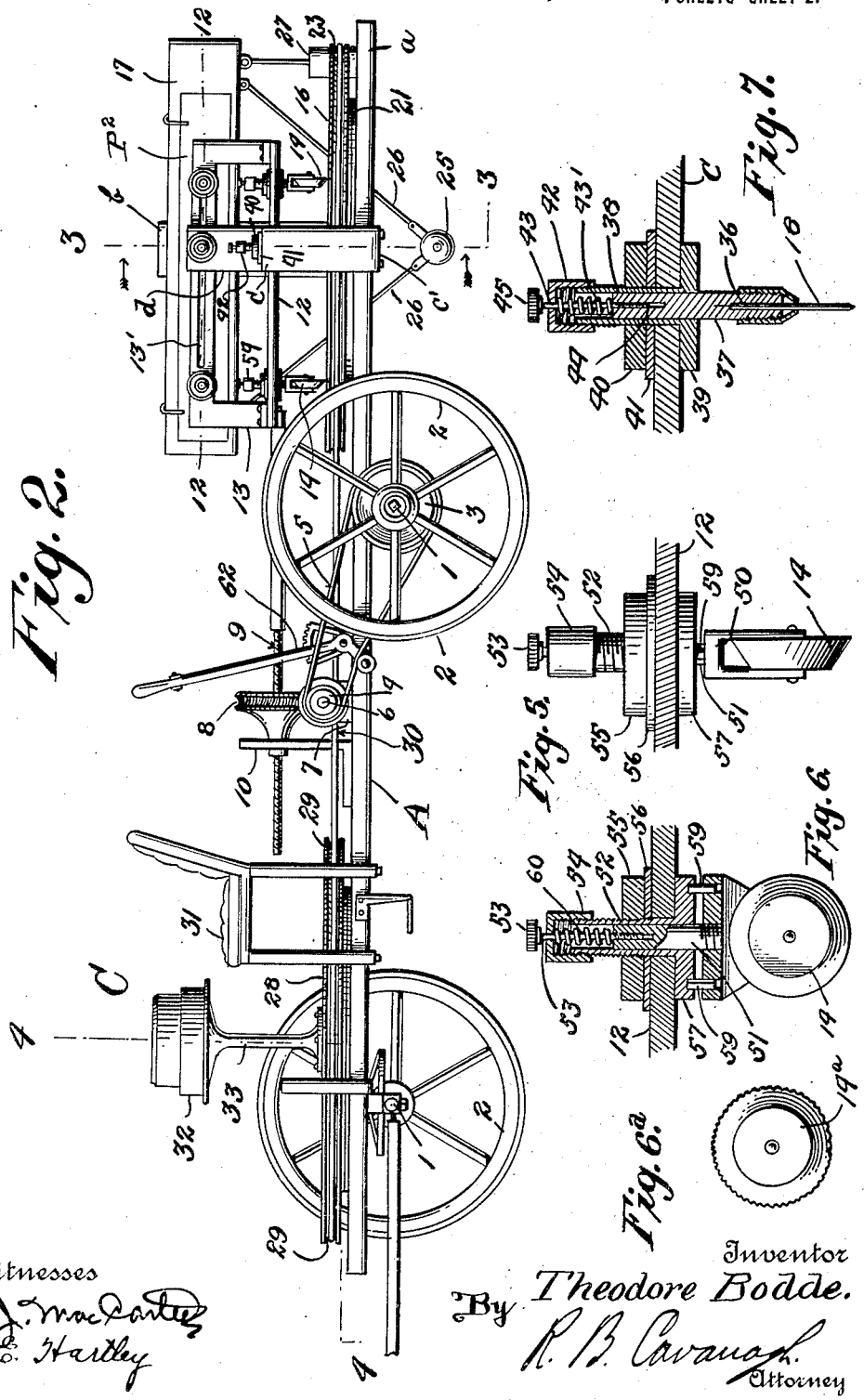

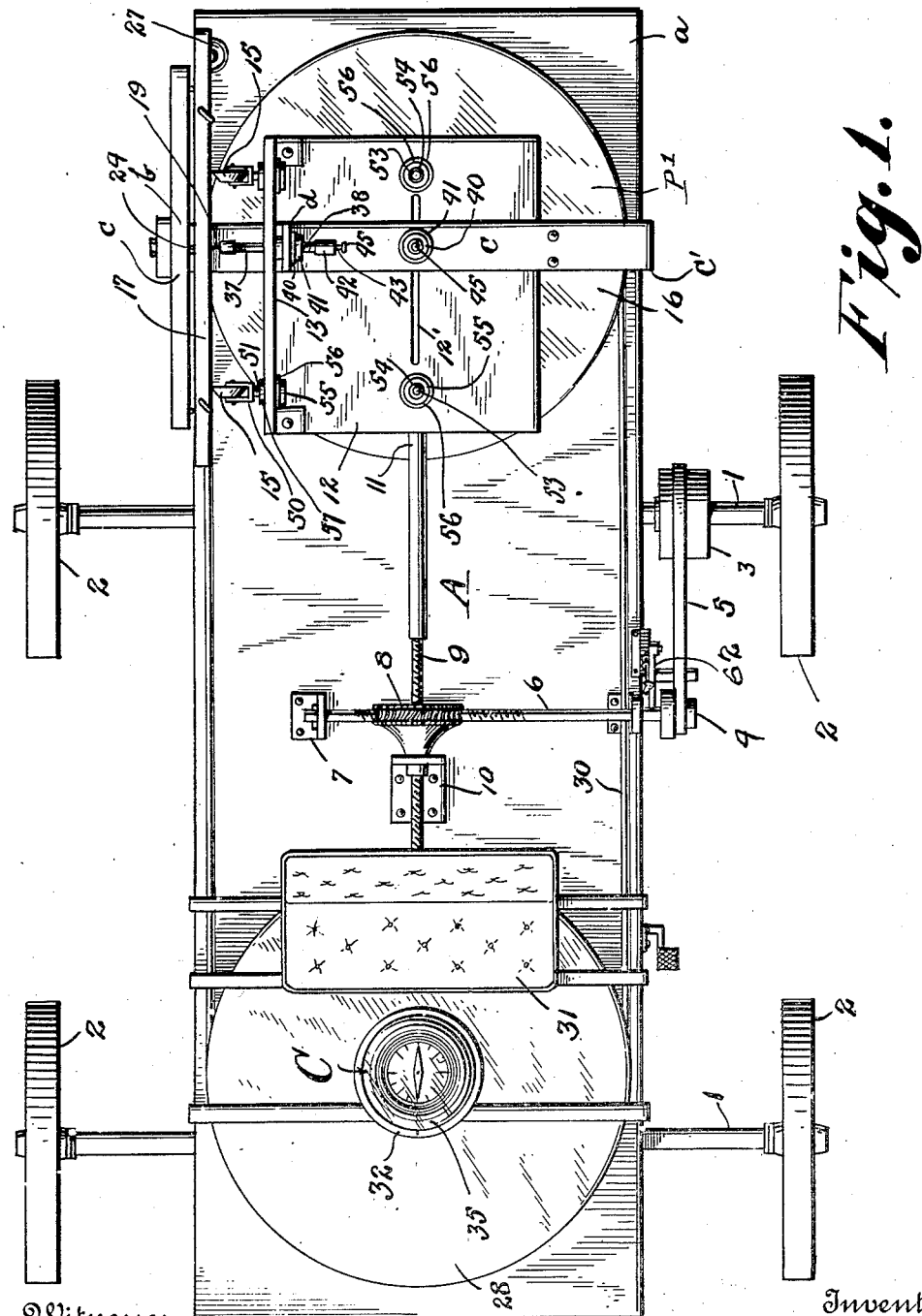

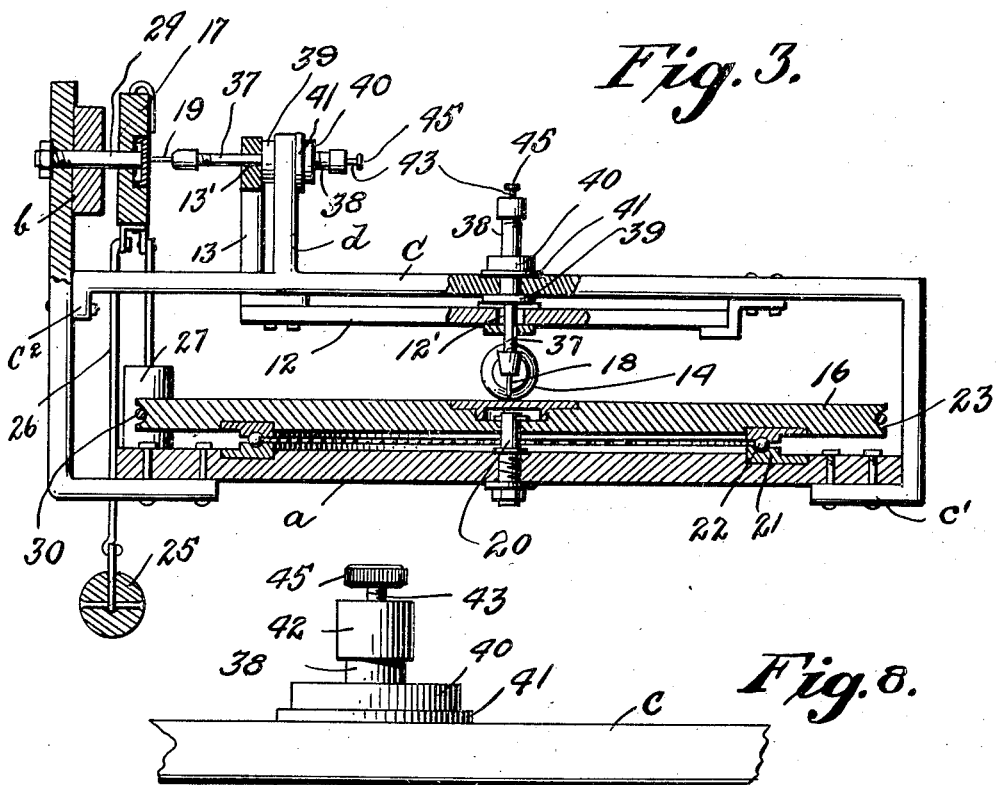

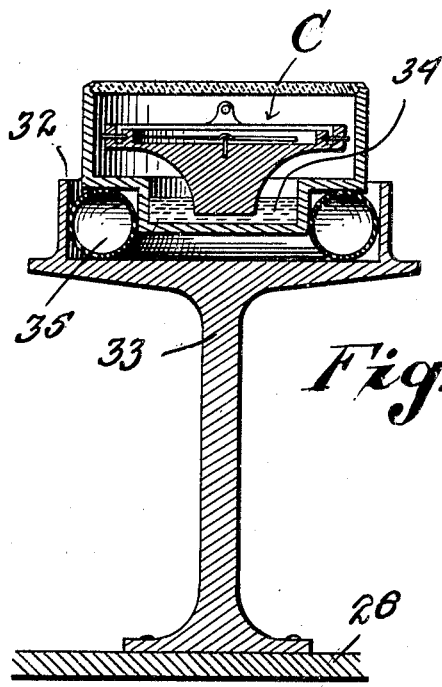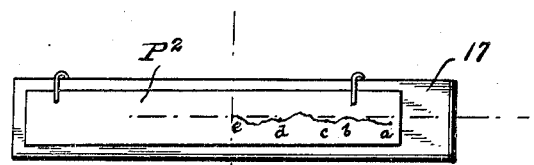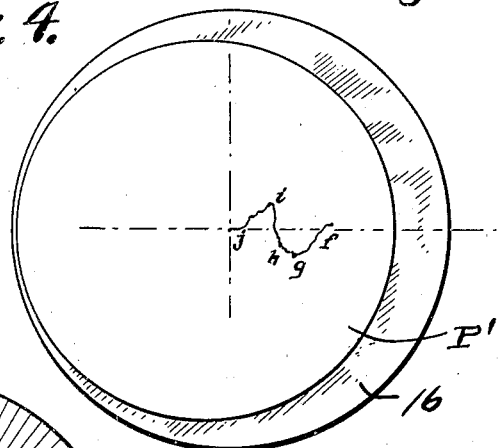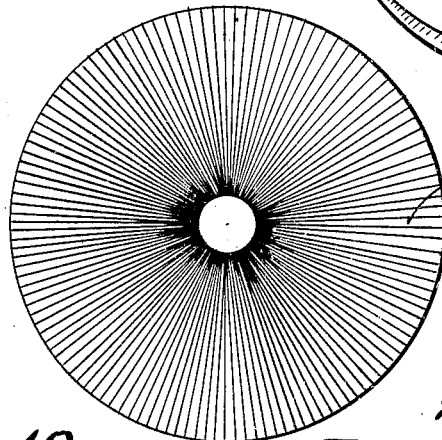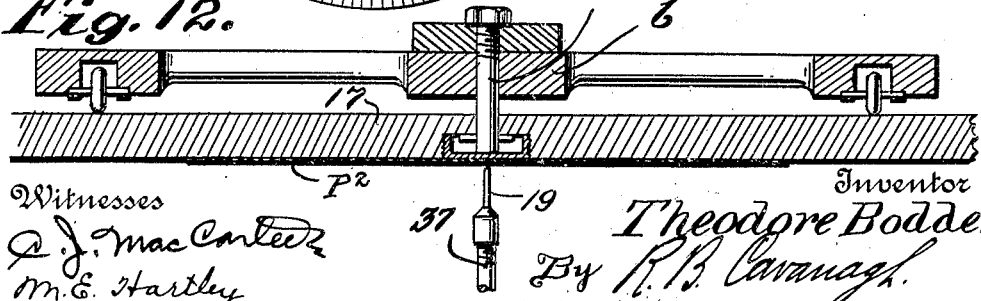

UNITED STATES PATENT OFFICE.

THEODORE BODDE, OF NORTHFIELD, VERMONT, ASSIGNOR OF ONE-THIRD TO FRANK E. AUSTIN, OF HANOVER, NEW HAMPSHIRE.

SURVEYING-MACHINE.

1,200,702.  Specification of Letters Patent.  Patented Oct. 10, 1916.

Application filed February 28, 1913. Serial No. 751,331.

*To all whom it may concern:*

Be it known that I, THEODORE BODDE, a subject of the Queen of the Netherlands, residing at Northfield, in the county of Washington and State of Vermont, have invented certain new and useful Improvements in Surveying-Machines, of which the following is a specification.

This invention relates to a machine by means of which a map or maps of the course traversed may be accurately and expeditiously prepared.

In carrying out my invention it is my purpose to provide a machine of the class described which will be found especially adapted for use in surveying and mapping a course traveled through unfamiliar territory, or the regions about to be traversed by a moving army. By the use of my invention the surveying and mapping of the course, road or boundary along which the machine is propelled or drawn may be accomplished with a minimum of error and with far greater expedition than is possible by the ordinary methods of surveying.

While I have herein shown and described a preferred embodiment of my invention, I wish it to be understood that I do not confine myself to all the precise details of construction which are herein set forth by way of illustration, as modification and variation may be made without departing from the spirit of the invention or exceeding the scope of the appended claims.

The invention consists in the construction, combination and arrangement of parts set forth in and falling within the scope of the appended claims.

In the accompanying drawings: Figure 1 is a top plan view of a road surveying machine embodying my invention. Fig. 2 is a view of the same in side elevation. Fig. 3 is a sectional view taken on the line 3—3 of Fig. 2. Fig. 4 is a sectional view taken on the line 4—4 of Fig. 2. Fig. 5 is a detail view in elevation of one of the friction rollers. Fig. 6 is a detail view in section of the mounting of one of the friction rollers, the roller itself being shown in elevation. Fig. 6ª shows another form of friction roller, the periphery being serrated or toothed. Fig. 7 is a vertical sectional view taken through one of the pencil holders. Fig. 8 is a view partly in section and partly in elevation and showing a modified form of paper marking device which may be employed instead of the pencil. Fig. 9 is plan view of a modified form of rectangular map board. Fig. 10 is a modified form of the circular or disk map board. Fig. 11 is a specimen of the plan and elevation maps drawn by the machine. Fig. 12 is a sectional view taken on the line 12—12 of Fig. 2.

In the present instance, my road surveying machine embraces among other features a vehicle which is designed to be propelled or drawn over the road or boundary to be surveyed and mapped. This vehicle is provided with map boards forming surfaces against which the paper for the map is placed. I also provide suitable marking implements, such as pencils, for drawing the maps on the paper while the machine is in motion, as will be hereinafter fully described.

Referring to Fig. 1 of the drawings, the letter A designates a vehicle of any preferred form which is provided with the usual axles 1 and the ground wheels 2. On the rear axle is a pulley 3 arranged in driving engagement with the stepped pulley 4 by means of the endless belt 5. This stepped pulley 4 is fast with one end of the worm shaft 6, the opposite end of such shaft being journaled in the bracket 7 secured to the body of the vehicle. This worm shaft 6 meshes with the gear pinion 8 through which latter is threaded the screw rod 9. The numeral 10 indicates a second bracket or support bolted to the body of the vehicle and adapted to rotationally support the gear pinion 8 as shown in Fig. 1. Hence, when this gear pinion 8 is held in translational rest by means of the bracket 10, and the rod 9 is held in rotational rest, the rotation of the pinion will produce a translational motion of the rod 9. When the vehicle advances, this translational motion, in Fig. 1, takes place from left to right. To the end 11 of the rod 9 is attached a horizontally disposed carriage 12 which in turn supports a vertical carriage 13. Along the center line of the horizontal carriage 12, I arrange a pair of small friction wheels or rollers 14 which are preferably formed with beveled peripheries, while at the center line of the vertical carriage 13 is provided a similar pair of friction wheels or rollers 15. To all of these friction wheels is communicated the translational motion of the rod 9. These friction wheels are placed with their own axes parallel to the translational motion so that if they press down on a sheet of paper, the friction between their rims and the paper will cause the latter to be carried along in this translational motion while at the same time, the free rotation of the wheels or rollers in a plane perpendicular to such translational motion will leave the paper free to move at an angle to its translational motion. This free motion of the paper is necessary to move the paper in accordance with the direction taken by the vehicle while the map line is being drawn.

With the present machine, I aim to simultaneously draw two maps, one a plan and the other an elevation. In making the map in plan the paper P' will rest upon the horizontally disposed circular board or disk 16 pivotally mounted on the floor $a$ of the vehicle, while in drawing the map in elevation the paper P² will rest against the vertically disposed rectangular board 17 pivoted to the bracket $b$ supported from the floor of the vehicle. The map lines in one form of the invention are drawn by means of pencils 18 and 19, the former drawing the map in plan and the latter in elevation. Referring particularly to Fig. 3, it will be seen that the disk 16 is mounted upon the pivot 20 extending through the floor $a$ so that it is free to rotate, and in order to further insure the easy movement of the disk, I interpose between the floor and disk the circular ball-race 21 for the ball bearings 22. The periphery of this board or disk 16 is grooved, as at 23, for the purpose hereinafter described. The pencil 18 is arranged above the top surface of the disk 16 diametrically opposite the pivot. It is mounted in a holder hereinafter described, which holder is supported on the angular cross bar $c$ which is fastened at one end to the floor $a$ as at $c'$, and at its opposite end to the bracket $b$ at $c^2$, this cross bar $c$ bridging the disk 16 and the horizontal carriage 12. The vertical map board 17 is mounted upon a horizontally disposed pivot 24 carried by the bracket $b$ with the pencil point 19 arranged diametrically opposite such pivot, as is clearly shown in Fig. 3. The holder for the pencil 19 is similar in construction to the holder for the pencil 18 and is mounted on an arm $d$ extending vertically from the cross bar $c$. The spindle carrying the pencil 18 extends vertically downward through an elongated slot 12' in the carriage 12, while the spindle of the pencil 19 projects through an elongated slot 13' in the carriage 13. It will be seen that the pencils lie just at the center of rotation of the disk 16 and the rectangular board 17 respectively. Hence, a piece of paper though under the pressure of the friction wheels and the pencil will rotate freely with its supporting board against which it is pressed, and the pencil being just at the center of this board will not describe the least circle or arc on the paper during such rotation. At the same time that these papers rotate with the boards on which they rest, with the pencil points at centers, they are drawn under these pencil points in the direction of the translational motion of the friction wheels or rollers moving with the carriages 12 and 13, the elongated slots 12' and 13' permitting the free movement of the carriages without disturbing the pencils. This will produce lines on the paper, which if the disk is always moved in accordance with the direction taken by the vehicle will be a map in plan view, while with the rectangular it will be a map in elevation on condition that the rectangular board be always maintained level. This will be readily apparent, as the translational motion of the paper is proportional to the distance over which the vehicle is moving and always in the same direction as the direction of movement of such vehicle. At a turn of the road, the line drawn on the plan map will turn also, because the paper gets a new movement in accordance with the direction taken by the vehicle with respect to the friction wheels, by means hereinafter described. Likewise at an ascent or descent of the road, the line drawn on the elevation map will ascend or descend also, because the paper receives a new direction north-south in the vertical plane with respect to the friction wheels. This level orientation of the rectangular or map board 17 is attained by means of the weight 25 suspended by the rods 26 from the lower portion of the map board, which weight brings the center of gravity of such board relatively lower than its center of rotation so that the board is always maintained level. In order to annul the effect of the vibrations of the vehicle on this leveling motion, a small dash pot 27 is interposed between the map board 17 and the body of the vehicle. The horizontally disposed disk or board 16 is moved in accordance with the direction taken by the vehicle by means of a second horizontally disposed disk 28 pivoted on the platform at the forward portion of the vehicle. This disk 28 is peripherally grooved as at 29 and is in driving engagement with the disk or board 16 through the endless belt 30, the belt running through the grooves in the peripheries of the disks. The forward disk 28 is of exactly the same diameter as the disk or board 16 so that when the disk 28 revolves over certain angles, the disk 16 will revolve over precisely identical angles. In other words, if the disk 28 is kept directed in accordance with the direction taken by the vehicle, the disk 16 will be kept orientated likewise. This disk 28 has mounted at its center a marine compass indicated as an entirety by the letter $e$ and in order to keep the disk moving in accordance with the direction taken by the vehicle it is only necessary for the operator at the seat 31 to keep the hand of the compass pointing at the same mark of the compass rim 32 during the travel of the vehicle. This is accomplished by turning the rim in the same manner employed in the steering of a ship. In this analogy, however, the disk 28 will correspond to the ship, with this difference, that while the ship is turned by means of a rudder, in my machine the disk is turned by means of the compass rim itself.

In the practice of my invention, I prefer to employ the type of compass which is shown in detail section in Fig. 4. This includes the usual stand 33 in which the compass is mounted, and as the ordinary gimbal rims of a compass would permit the latter to swing freely with every swinging motion of the vehicle, the lower part of the compass is suspended in a body of liquid 34, which may be glucose, glycerin, oil or the like. This will tend to check any undue swinging or shifting of the compass. To avoid or check the vibratory motion of the compass, due to the vibrations of the vehicle, I provide a tubular annular air cushion 35 arranged in the stand, and upon which the compass is set as clearly shown in Fig. 4 of the drawings. If a gyroscopic marine compass be employed, the checking device will not be found necessary, and I therefore wish it to be understood that the use of such a gyroscopic compass is contemplated in the practice of my invention. The rim 32 of the compass stand 33 permits it to be turned and moved in the direction taken by the vehicle in spaces, and with it will be orientated the disk 28 and consequently the disk or board 16 belted to the disk 28.

In Fig. 11, I have illustrated a map in plan, and a map in elevation as drawn by my machine. In the specimen elevation map the friction wheels 15 moving from left to right, in coöperation with the pencil point which remains always in the center of rotation, have formed upon the paper the map line $a$—$b$—$c$—$d$—$e$, which is the elevation view of the road along which the vehicle has traveled. In the specimen plan map, the friction wheels 14, moving from left to right, in coöperation with the pencil point 18, which always remains in the center of rotation, have formed upon this paper the map line $f$—$g$—$h$—$i$—$j$, which is the plan view of the road along which the vehicle has traveled. The length of the two map lines must be exactly the same, as they are both equal to the total length over which the rod 9 has moved. Now it may be that the plan view will contain a small error due to the fact that the length of the line has been measured by means of the wheels of the vehicle along the inclined road of travel, instead of being measured always along a horizontal line as should be done in surveying. However, this error is less than .005 so long as the road is not inclined over 5 degrees as is the case in flat countries and may be disregarded. For greater inclinations of the road, however, as in mountainous countries, the error may be corrected by means of the elevation map. From the latter the horizontal distance of the line $a$—$b$—$c$—$d$—$e$ may be directly ascertained, and this distance should be the true length of the line $f$—$g$—$h$—$i$—$j$ of the plan map, and the correction may be made accordingly. As to the elevation map, it need not be corrected at all, as it is perfect as produced by the machine, and the vertical distance between two points gives the elevation distance between these points, and these figures may be marked in the corresponding points in the plan view to produce a complete map. Corresponding points such as $b$ and $g$, $c$ and $h$ in the two maps may be produced from time to time during the travel of the vehicle by giving a pull or jerk to both pencils simultaneously. This will produce small ticks or marks on the map lines as shown in Fig. 11, which will be the corresponding points. Or if desired, these points may be marked by means of special pencils which have their points arranged a little to one side, but almost at the center of the tables.

In Fig. 7 I have illustrated a preferred construction of the pencil holding devices. As the holders for all the pencils are similar in construction a description of one, or the holder for the pencil 18, will suffice. In this holder the pencil 18 is socketed at 36 in the end of the spindle 37, which as mentioned extends through the slot 12' in the carriage 12. The upper portion of the spindle is enveloped by the sleeve 38 which projects through the cross bar $c$, and this sleeve is provided with the flange 39 at its lower end, and which flange bears against the under face of the bar. The sleeve is clamped in position by means of the nut 40 bearing against the washer 41, the latter contacting with the upper face of the bar $c$. The upper end of the sleeve is surmounted by the threaded cap 42, while 43 designates a screw rod extending through the cap and having its lower end socketed in the top of the spindle as at 44. A tension spring 43' surrounds the rod and bears at its upper end against the cap and at its lower end against the spindle. The outer end of this rod is provided with a thumb nut 45 for adjusting purposes. From such a construction it will be seen that the pressure of the pencil may be adjusted and also the pencil elevated from contact with the paper when desired.

In Fig. 8 I have shown another form of the paper marking or map delineating instrument. In this case I employ as a substitute for the pencil point a small toothed or knurled roller 46 mounted upon the spindle 47 by means of the set screw 47'. When the paper is pulled or moved beneath this toothed roller, a dentated line is traced. These dentated marks are not intended to penetrate the paper, as it is not my intention to stencil, but merely to obtain a visible line upon the surface of the paper. The numeral 48 designates a small smooth roller lying in a recess 48' formed in the map board beneath the paper, this smooth roller opposing the toothed roller 46, the purpose of the roller 48 being to take up any friction which would be produced under the pressure of the toothed roller between the paper and the map board. This roller 48 is mounted upon the support 49 carried by the stud 20, the modified form being shown as used in conjunction with the disk 16, but of course it is also applicable to the plan map board. When used, these rollers 46 and 48 are arranged at the center of rotation of the map boards 16 and 17, and as will be seen from Fig. 8, their axes are at right angles to the axis of the map board and their planes of rotation are presumed to be in line with the direction of translation of the friction wheels 14. The purpose of this is to allow the paper to be freely drawn along between the rollers by the translational motion of the friction wheels. These rollers perform a two-fold function. First, a line is traced on the paper as already described, and second, they form a rigid pivot for the revolution of the paper so that no vibration of the vehicle can shift the latter from its true position. This pivot which is formed by the teeth of the roller 46 coincides at every instance with the center of rotation of the table. This roller 46 might also be used to communicate to the paper the translational motion by suitably gearing the roller to the driving wheels of the vehicle. When using this toothed roller 46 instead of the pencil, the corresponding points on both maps may be marked very easily by giving a sudden twist over an angle of 90 degrees to these rollers. This marks the dentated lines visibly at the points where the twist was given.

In Figs. 5 and 6 I have shown in detail one manner of mounting the paper moving friction rollers or wheels, in this instance one of the rollers 14 being chosen for illustration but of course it is to be understood that all the rollers may be similarly mounted. The numeral 50 indicates a bifurcated bracket in which the roller 14 is journaled, while 51 is the shank of the bracket extending into the sleeve 52 which projects through the carriage 12. The wheel carrier also is provided with a threaded adjusting rod 53 socketed in the shank, the cap 54 threaded on the sleeve, the nut and washer 55 and 56 above the carriage 12 and the flange 57 carried by the sleeve and resting against the under side of the carriage 12.

Fig. 6 also shows clearly the guide pins 59 and the tension spring 60, which latter surrounds the rod 53 and bears at its ends against the cap 54 and the ends of the shank 51. The guide pins are employed to hold the friction rollers in the same plane at all times. It will be seen that the pressure of each roller may be regulated by means of the cap 54, while the wheel may be bodily elevated from the paper through the medium of the thumb nut at the end of the screw rod which is socketed in the shank 51.

In Fig. 6$^a$ the roller 14$^a$ is provided with a toothed periphery and this form of roller may be used in all instances in place of the form with the smooth unbroken periphery.

In Figs. 9 and 10 I have shown a slightly modified form of disk and rectangular board for the maps. Instead of having smooth, unbroken surfaces as shown in Fig. 1, the disk and rectangular board are provided with a series of grooves or knife cuts as shown at 61. This is done in order to increase the friction between these surfaces and the paper which is pressed against them, but only in a direction perpendicular to the translational motion of the paper so that the latter will be certain to follow the rotational motion of the surfaces.

From the above description taken in connection with the accompanying drawings, the construction and method of employing my improved machine will be readily apparent to those skilled in the art. It will be seen that as the machine progresses, the shaft 9 is fed longitudinally, or given a translational motion through the power transmission connections with the axle of the ground wheels, and the horizontal and vertical carriages carrying the friction rollers are correspondingly moved so that they feed the paper past the pencils in a manner heretofore described for the purpose of drawing the map lines. It may be that at one time it will be desired to make a map on a small scale and at another time to make a map on a larger scale, and therefore with my machine provision is made for making maps of different scales by shifting the belt from one section of the stepped pulley to the other by any suitable means such as by the belt shifter and tightener indicated at 62. If desired, instead of using a belt drive between the two horizontal disks I may employ a suitable gearing for this purpose, and I may also use gearing between the wheels of the vehicle and the belt pulley on the worm shaft. Furthermore, the machine may be constructed so that a variable reduction of the original motion of translation of the vehicle may be obtained, and consequently a variable map scale may be made.

While I have herein shown and described one particular embodiment of my invention, I wish it to be understood that I do not confine myself to all the precise details of construction herein set forth, as modification and variation may be made without departing from the spirit of the invention or exceeding the scope of the appended claims.

What I claim is:—

1. In a machine of the class described, the combination with a vehicle, two rotatably mounted map boards, both having stationary centers, a stationary drawing implement arranged at each map board, for drawing upon a map carried by each board, and means operated on the movement of the vehicle for moving the maps past their drawing implements to mark the path of travel of the vehicle on such maps.

2. In a device of the class described, the combination with a rotatable map board adapted to support a map thereon, and a drawing instrument mounted adjacent the board, means, including a carriage movable over the board, and map engaging members carried by the carriage, for moving the map past the drawing instrument to mark the path of travel of the vehicle thereon.

3. In a machine of the class described, the combination with a vehicle, of a support for the map to be drawn, a map drawing instrument, and means operated by the movement of the vehicle for moving the map past the map drawing instrument to draw the path of movement of the vehicle on the map, said means including a carriage, and map engaging friction disks carried by the carriage.

4. In a machine of the class described, a vertically disposed movable map support, a drawing instrument located adjacent thereto, and means including a shiftable carriage, and map engaging members carried by the carriage for moving a map on the board past the drawing instrument and in contact with the latter.

5. In a machine of the class described, the combination with a vehicle, of a map support, a map marking device, and means for moving the map past the marking device, said means including wheel members moving along a straight line parallel to their axes and in proportion to the distance over which the vehicle has traveled.

6. In a machine of the class described, the combination with a plurality of map supports and drawing instruments located adjacent thereto, of friction wheels operable to move the map past the drawing instruments, said wheels being capable of movement of translation, the rotation of said wheels being in a plane perpendicular to the supports, with the motion of said wheels parallel to said supports.

7. In a machine of the class described, the combination with a vehicle, of a map support, and a movable friction member adapted to engage a map upon the support in such manner that said map will be moved by the translational motion of the friction member, while it is carried by the rotational motion of the support.

8. In a machine of the class described, the combination with a rotating map support, of a roller located at the center of rotation of the support with its axis perpendicular to that of the support, and a map marking device located in substantially the same plan as the roller and adapted to mark upon a map as the latter is moved past the roller and in contact with the map marking device.

9. In a machine of the class described, the combination with a vehicle, of a horizontally disposed rotating map support, a vertically disposed rotating map support, a stationary map marking device arranged in line with the center of each support, means for shifting the maps upon the supports past the map marking devices, and power transmission mechanism interposed between the vehicle and said means and operated upon the movement of the vehicle for actuating the map moving means.

10. In a machine of the class described, a map support, a map marking device, and friction wheels adapted to engage a map upon the support and moving with a translational motion in line with the map marking device.

11. In a machine of the class described, a map support, a map marking device, and friction wheels adapted to engage a map upon the support and moving with translational motion and rotational motion at right angles to each other.

In testimony whereof, I affix my signature, in the presence of two witnesses.

THEODORE BODDE.

Witnesses:
H. PEARL HALL,
N. A. WHEELER.